JET NOZZLE PROTECTOR

Original Filed May 13, 1957

United States Patent Office

Re. 25,452
Reissued Oct. 1, 1963

25,452
JET NOZZLE PROTECTOR

Will S. Sease, Fort Worth, Tex., assignor to Chicago Pneumatic Tool Company, New York, N.Y., a corporation of New Jersey Original No. 2,868,512, dated Jan. 13, 1959, Ser No. 658,573, May 13, 1957. Application for reissue Oct. 10, 1960, Ser. No. 61,791
7 Claims. (Cl. 175—340)

Matter enclosed in heavy brackets [ ] appears in the original patent but forms no part of this reissue specification; matter printed in italics indicates the additions made by reissue.

This invention relates to jet nozzles particularly of the type employed in earth boring drills to augment the drilling action rate by discharging a high velocity stream of flushing fluid to the bottom of the bore hole.

It is customary to provide a jet drilling bit with a nozzle made of tungsten carbide alloy or similar wear resistant material, the nozzle being inserted into a jet passage in the bit head and held against separation therefrom by a retaining ring seated in a recess formed in the bit head passage. The nozzles vary as to the size and shape of the opening which is selected to suit local conditions. In order to permit ready assembly and disassembly, and therefore replacement, of the nozzle in the field, the retaining ring is constructed as a snap ring adapted to be installed into and taken out of the associated recess in the jet passage, the ring being held only along a thin marginal area.

Due to the shape of the opening in the nozzle, which is designed to increase the velocity of the discharging fluid, there is a hydraulic force tending to blast the nozzle out of the bit head passage to the bottom of the bore hole. Normally, this force is effectively counteracted by the retaining ring. However, in drilling areas where abrasion is severe, and under certain adverse conditions the turbulent drilling mud, carrying with it the entrained chips from the bottom of the hole, causes abrasion of the snap ring and adjacent portion of the passage. This action wears away the support for the retaining ring with the result that the latter frequently yields to permit the nozzle to be blown from the bit head. The result of the loss of the nozzle will be an immediate drop of pressure of the drilling mud or flushing fluid, usually accompanied by a reduction in drilling speed as there is a loss of the benefit of the jet action of the extruded nozzle and an impairment of the jet action of the remaining nozzles in the rock bit. In the usual instance of a lost nozzle, the driller immediately pulls the bit and replaces it with a new one as the reduction in penetration rate would make it uneconomical to continue drilling. The change of a bit, of course, involves a loss of time especially when drilling at great depths. Moreover, on occasion, the driller will notice the drop of pressure and not knowing that a nozzle is lost, may waste time checking the mud pump for damage on the theory that the trouble arose in the surface equipment.

The general object of this invention is to prevent the loss or expulsion of a nozzle from a jet bit, without sacrificing the advantage of replaceability of the nozzle.

Another object is to line the wall of the jet passage below the nozzle with an abrasion resisting material and thus protect the retaining ring from any weakening of its support by erosion thereof.

A further object is to seal off the retaining ring and adjacent supporting structure from the jet fluid or drilling mud.

A feature of this invention is a shield made of rubber-like material supported in the jet passage below the retaining ring and having at its top an annular flange extending through the retaining ring into contact with the bottom of the nozzle.

Other objects and features of the invention will appear more clearly from the description which follows.

Figure 1:
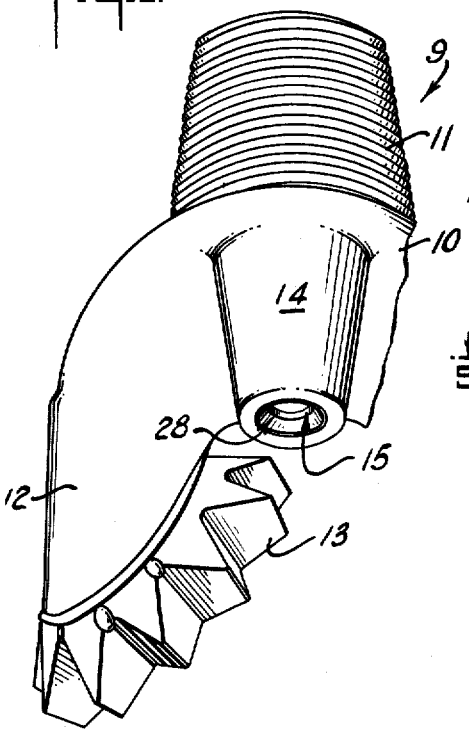
FIG. 1 is a fragmentary perspective view of a rock bit of the 3-cone type equipped wtih a nozzle protector according to the present invention.

Referring to FIG. 1, a bit head 10 of the usual form is provided with a threaded shank 11 for attachment to the lower end of a drill stem (not shown) whereby the bit head may be rotated about its vertical axis. The bit head has three legs 12 (one shown) extending downward and outward. Each leg supports near its lower end a conical cutter 13 (part of one cutter being shown) arranged to be carried by the bit head in its rotation and also to rotate relative to the bit head about an individual axis inclining downward and inward. Integral with the bit head is a boss 14 which is hollow to provide a passage 15. The latter provides a means for discharging a liquid flushing fluid, such as drilling mud, to the bottom of the hole for removing the cuttings or particles of detritus.

Figure 3:
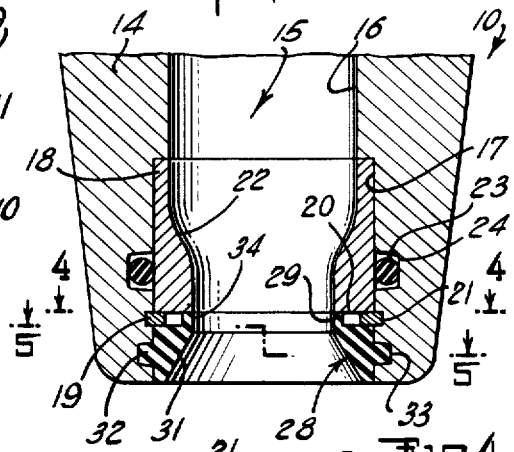
FIG. 3 is a longitudinal section on the same scale as FIG. 2 of a nozzle provided with the shielding arrangement of the present invention.
Figure 4:
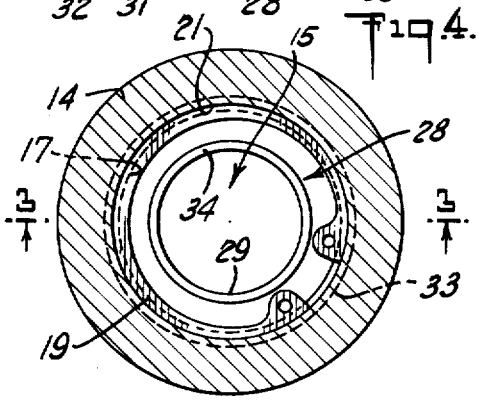
FIG. 4 is a cross-sectional view as indicated by the arrows 4 in FIG. 3, the plane of the section corresponding to that of the upper face of the retaining ring and the upper edge of the protecting shield therefor.

Referring to FIG. 3, the passage 15 comprises a bore 16, the lower end of which is provided with a counterbore 17 for the reception of the usual nozzle 18. The nozzle is first inserted slidably into the counterbore and is then held seated at the upper end of the counterbore by a retaining ring or snap ring 19 (FIG. 4) inserted by expansion into an annular groove 21 provided in the counterbore 17. *The snap ring has a locking engagement with a flat transverse wall or surface* 20 *at the base of the nozzle* 18. The nozzle 18 has a central opening 22 which is so contoured as to provide a streamlined reduction in cross-section, whereby the velocity of the flushing fluid is greatly increased as it passes through the nozzle. As a result, there is a considerable drop in pressure between the entrance and the exit of the nozzle and this hydraulic condition sets up a force which tends to eject the nozzle from the counterbore 17. In a rock bit which is new, or only partly worn, this force is effectively overcome by the retaining ring 19. At the same time, there is a tendency for the flushing fluid to bypass the nozzle 18 between the wall of the counterbore 17 and the outer cylindrical surface of the nozzle. To avoid such leakage, there is provided a fluid-tight shield about the nozzle, consisting of a rubber O-ring 23 mounted in an annular recess 24 in the counterbore 17.

Figure 2:
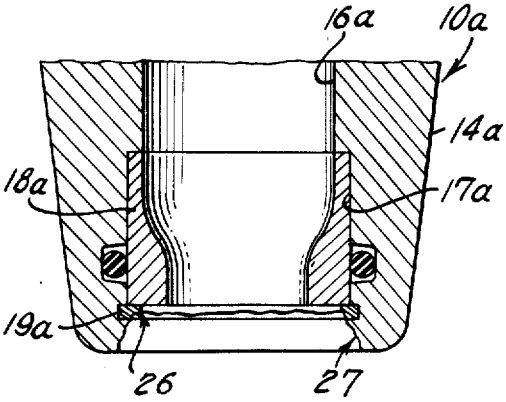
Fig. 2. PRIOR ART
FIG. 2 is an enlarged longitudinal section through a conventional nozzle in worn condition, the arrows indicating the areas in which wear or erosion is most likely to occur.
Figure 5:
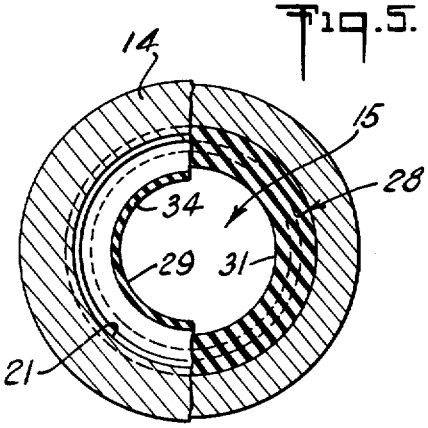
FIG. 5 is a cross section as indicated by the irregular line 5—5 in FIG. 3, showing part of the shield in elevation and other parts in section.

The apparatus specifically described up to this point does not differ from prior structures except for changes in dimensions. As seen in FIG. 2, the bit head 10a of the prior art comprises a boss 14a, a bore 16a, counterbore 17a, nozzle 18a, and retaining ring 19a, similar in construction to the corresponding elements 16, 17, 18 and 19 of FIG. 3, except that in the prior art, the lower end of the counterbore 17a is not as long as counterbore 17 of this invention, with the result that the nozzle 18a and related parts are not spaced as far from the lower end of the boss 14a as are the corresponding elements 18, 19 and 21, 23 and 24, in the invention of FIG. 3. For a further description and explanation of a nozzle retaining construction of prior art arrangement, reference is made to British Patent 754,320, published August 8, 1956. Such prior arrangements have proven successful with one exception.

As stated previously, the hydraulic force tending to blast the prior art nozzle 18a out of the bit head, is effectively sustained by the retainer ring 19a when the rock bit is new or not worn abnormally. However, in certain drilling areas where abrasion is severe, under certain conditions, the retaining ring 19a and bit head boss 14a will be worn away through turbulence or back wash of the drilling mud. The areas where the abrasive mud strikes effectively to erode the retainer ring 19a and counterbore 17a are indicated respectively by the arrows 26 and 27 in FIG. 2. As a result, the counterbore 17a is enlarged and the retainer ring 19 reduced in thickness until the ring can no longer hold back the fluid pressure and the nozzle 18a will be blown out of the bit head.

The problem is overcome by the present invention which provides a means of shielding the outlet end of the jet passage 15 from the abrasive effect of the drilling mud and of the particles of detritus which may be entrained therein by the turbulent action.

Referring particularly to FIG. 3, the shield 28 of this invention is in the form of a ring made of rubber-like material such as neoprene. It has a cylindrical bore 29 at its upper end adapted to coincide with the outlet end of the opening 22 of the nozzle 18. Below bore 29, the opening in the rubber shield 28 consists of a funnel shaped portion 31 diverging downward. Extending around the annular shield 28 is an integral rib 32, the upper and lower sides of which taper outwardly. The bit head boss 14 near the lower end of the counterbore 17, is provided with an annular recess 33 shaped to receive and loosely fit the circumferential rubber rib 32. Below the rib 32, the body of the rubber shield 28 has a diameter which, when the shield is detached, is slightly in excess of the diameter of the counterbore 17. When the ring is being assembled into the counterbore, it is compressed as it is forced upward until the rib 32 is in position in the complementary recess 33, whereupon the rubber in the rib 32 is expanded back to its normal diameter or nearly so, while the lower periphery remains under slight compression. This prevents the entry of foreign material, such as particles of drilling mud or detritus, from entering between the shield 28 and the lower end of the bit head boss 14. Above the circumferential rib 32, the rubber shield 28 has a very slight clearance (only a few thousandths of an inch) both circumferentially with respect to the counterbore 17 and endwise in relation to the retaining ring 19. These clearances facilitate assembly by permitting the rubber shield 28 to slip into place without excessive interference. An annular flange 34, surrounded by the retainer ring 19 in closely spaced relation, extends upward from the body of the rubber ring 28 a sufficient distance to engage the *transverse wall or surface 20 which forms the* bottom [of the] face of the nozzle 18. Such engagement provides slight endwise compression of the rubber to prevent the entry of foreign matter between the rubber shield 28 and the nozzle 18.

In operation, the rubber shield 28, being under slight axial and radial compression completely seals off the counterbore passage 15 from the nozzle 18 to the lower end of the passage 15 and of the bit head boss 14. The turbulence of the drilling mud occurs as before except that the stream of abrasive fluid is prevented from impinging against the retainer ring 19 or against the counterbored wall 17 of the bit head 10. The nozzle 18 is retained even under the most adverse drilling conditions in assembled condition throughout the life of the rock bit 9 or until cutters 13 are worn out. The shield 28, although subject to impingement by the turbulent stream of drilling mud, does not become worn to any considerable extent because the resiliency of the rubber acts as a cushion to attenuate the force of the abrasive particles.

While the invention has been illustrated and described in connection with a jet rock bit of the three-cone type, it is adapted for protecting nozzles in other types of jet bits.

What is claimed is:

1. An earth boring drill comprising a bit head having a passage for the delivery of flushing fluid, a jet nozzle inserted slidably into the end of said passage *and having a transverse surface,* a retaining ring for the nozzle mounted in said passage below the *transverse surface on the* nozzle *and in locking engagement with said surface,* and an annular shield mounted in said passage below *the transverse surface on* the nozzle and *below the* retaining ring, said shield being arranged to [line] *contact* the passage wall *immediately adjacent the retaining ring* and protect [it] *the ring* from impingement by turbulent fluid with abrasive particles therein, *said shield having an upper portion which extends within and is surrounded by the retaining ring.*

[2. An earth boring drill according to claim 1, in which the shield is made of rubber-like material and has its upper end in contact with the lower face of the nozzle.]

[3. An earth boring drill according to claim 2, in which the upper end of the shield extends within and is surrounded by the retaining ring.]

[4. An earth boring drill according to claim 1, in which the shield is made of rubber-like material and is supported in an annular recess in the bit head passage, the rubber-like shield having a circumferential rib fitting into the recess and assembled therein by a snap action.]

[5. An earth boring drill according to claim 4, in which the body of the shield lying below the rib snugly engages the wall of the recess to prevent the entry of foreign particles between the shield and the surrounding portion of the bit head.]

[6. An earth boring drill according to claim 5, in which the shield has an annular flange at its top extending through the retainer ring and into contact at its upper extremity with the lower end of the nozzle.]

[7. In a jet device, a shield adapted for reception in a jet passage, said shield made of rubber-like material, said shield having an open end therethrough for the discharge of fluid with a jet action, the upper end of the opening being relatively constricted and the lower end diverging downward, the shield having a rib extending around its periphery, said rib being adapted to project with a snap action into a recess in the passage, said shield having a cylindrical portion snugly fitting the jet passage below the annular recess.]

[8. In a jet device adapted for reception in a passageway, a shield according to claim 7, in which the lateral faces of the circumferential rib taper outward.]

9. In a jet device, a passage for the flow of abrasive fluid, a jet nozzle supported in said passage, *said nozzle having a cylindrical surface fitting the passage, a rubber ring embracing the cylindrical surface to provide a fluid tight shield about the nozzle, said nozzle having a transverse wall spaced below the rubber ring and extending inward from the cylindrical surface,* a retaining ring abutting against the [lower end of] *transverse wall on* the nozzle and supported in an annular recess in the [passageway] *passage,* the retaining ring having a bore of larger size than the adjacent part of the bore of the nozzle, and [a shield] *shielding means* protecting the [retainer] *retaining* ring and adjacent passage against abrasion by the fluid, said [shield consisting of a ring] *shielding means being* mounted in said passage below the [retainer] *retaining* ring, the [shield] *shielding means* having an annular [flange] *portion* projecting through the retaining ring [into engagement with the lower face of] *and extending to the transverse wall on* the nozzle, [the shield] *and* also having a peripheral portion in sealing engagement with the passage below the ring, *the shielding means having a central bore extending therethrough, a part of said central bore being immediately surrounded by the annular portion of the shield, said central bore forming a continuation of the bore of the nozzle.*

*10. An earth boring drill comprising a bit head having a passage for the delivery of flushing fluid, a jet nozzle means inserted slidably into the lower end of said passage and having a transverse surface, a retaining ring for the nozzle means mounted in said passage below the transverse surface on the nozzle means and in locking engagement with said surface, and protector means for preventing fluid erosion of the retaining ring, said protector means being supported in the passage, said protector means having a reduced annular portion surrounded by the ring and having an enlarged lower portion integral with the reduced annular portion, the lower portion having a cylindrical surface contacting the passage wall immediately below the retaining ring whereby to protect the latter from impingement by turbulent fluid with abrasive particles therein, said protector means having a continuous opening extending therethrough and thereby being adapted to discharge fluid from the end of the protector means at a locality spaced a substantial distance below the retaining ring, said protector means forming an extension of the nozzle means.*

*11. An earth boring drill according to claim 10, in which the protector means has a transverse surface extending outwardly from the reduced annular portion, said last mentioned transverse surface being in contact with the lower face of the retaining ring.*

*12. An earth boring drill according to claim 10, in which the protector means is supported in the passage independently of the nozzle means, and is detachable from the nozzle means.*

*13. In a jet device, a passage for the flow of abrasive fluid, a jet nozzle supported in said passage, said nozzle having a cylindrical surface fitting the passage and having a transverse wall extending inward from the lower end of the cylindrical surface, a retaining ring abutting against the transverse wall on the nozzle and supported in an annular recess in the passage, the retaining ring having a bore of larger size than the adjacent part of the bore of the nozzle, and shielding means protecting the retaining ring and adjacent passage against abrasion by the fluid, said shielding means being mounted in said passage below the retaining ring, the shielding means having an annular portion projecting through the retaining ring into sealing relation with the transverse wall on the nozzle, and also having a peripheral portion in sealing engagement with the passage below the ring, the shielding means having a central bore which forms a continuation of the bore of the nozzle.*

*14. A jet device according to claim 13, in which the shielding means is formed separately from the nozzle and is composed of a softer material than the nozzle, said softer material being abrasion resistant.*

References Cited in the file of this patent or the original patent

UNITED STATES PATENTS

| | | |
|---|---|---|
| 1,990,007 | Sperry | Feb. 5, 1935 |
| 2,017,834 | Hummel | Oct. 15, 1935 |
| 2,376,616 | Oechsle et al. | May 22, 1945 |
| 2,723,498 | Hastrup et al. | Nov. 15, 1955 |
| 2,744,361 | Larson et al. | May 8, 1956 |
| 2,855,182 | Payne | Oct. 7, 1958 |

FOREIGN PATENTS

| | | |
|---|---|---|
| 1,111,992 | France | Nov. 2, 1955 |